Figure 1:
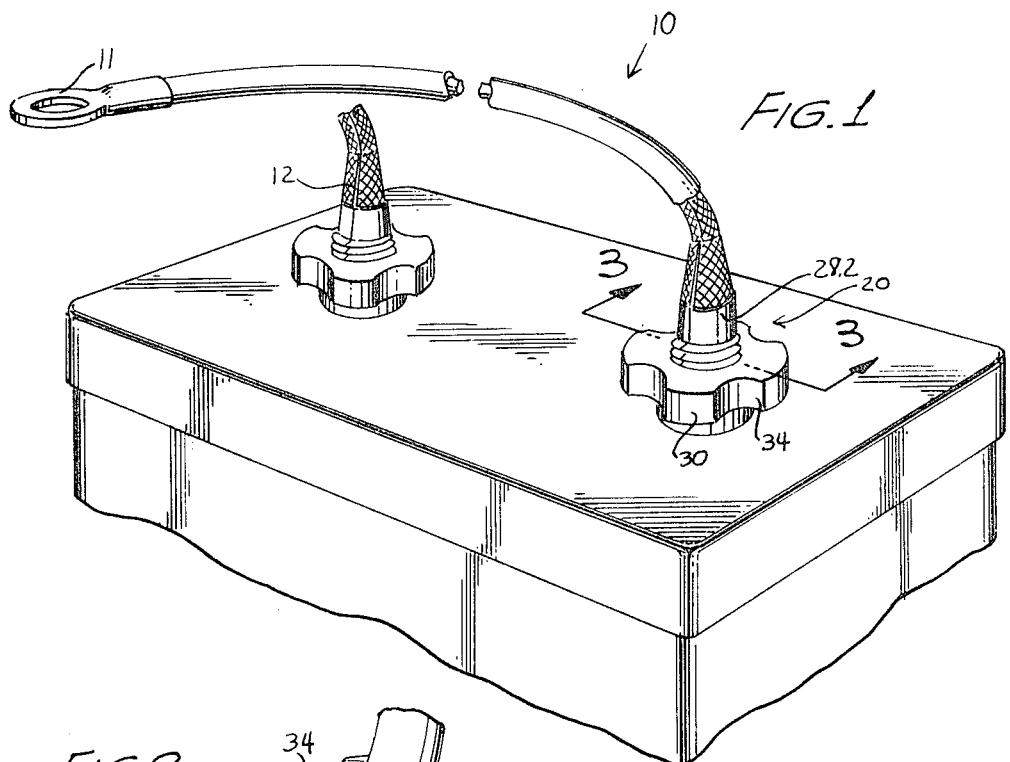

United States Patent [19]
Fouche

[11] 3,733,578
[45] May 15, 1973

[54] BATTERY CABLE
[76] Inventor: George H. Fouche, 111 Buxton Road, Falls Church, Va. 22046
[22] Filed: Feb. 24, 1972
[21] Appl. No.: 228,890

[52] U.S. Cl. .............................. 339/232, 339/268 R
[51] Int. Cl. .............................................. H01r 11/26
[58] Field of Search ..................... 339/224–240, 268

[56] References Cited
UNITED STATES PATENTS

| 1,857,121 | 5/1932 | Lade | 339/232 |
| 1,980,893 | 11/1934 | Walde | 339/268 S |
| 3,457,542 | 7/1969 | Wolf | 339/232 |

Primary Examiner—Joseph H. McGlynn
Attorney—Alfred W. Breiner

[57] ABSTRACT

A battery cable is described having attachment means at one end thereof for attachment to a battery terminal comprising split cable ends and on the separate ends thereof mated and threaded fittings for making electrical contact with the battery terminal and a threaded ring encompassing said cable, with the threads thereof mated to said threaded fittings for securing said cable to the battery terminal. The attachment means are easily attached and detached to the battery terminal without need of tools.

8 Claims, 3 Drawing Figures

Patented May 15, 1973  3,733,578

BATTERY CABLE

FIELD OF INVENTION AND BACKGROUND

This invention is directed to improved battery cables. More particularly, the invention is directed to battery cables which can be easily and quickly attached and detached from the battery terminal without need of tools.

In the prior art numerous designs of battery cables have been suggested in an attempt to simplify the manner of attaching and detaching a cable to and from battery terminals particularly after the cables have become corroded to the battery terminal. Among the suggested designs are cables having a split terminal fitting held together and in contact with the battery terminal with a suitable nut. Although such cables are an improvement over the conventional cables in some aspects, they have not served to replace conventional cables in spite of the cumbersomeness of conventional cables and the need to employ at least basic tools for removal and replacement of such cables. This apparently is due to the limited degree of movement of the split fittings causing difficulty in working with the fitting; the continued need of tools to remove and replace the nut holding the split ends together and in contact with the battery terminal when the nut is applied with sufficient force to hold the connector onto the terminal, and since the nut must be completely removed to permit convenient removal and replacement, it can be easily lost.

OBJECTS AND GENERAL DESCRIPTION OF INVENTION

Accordingly, it is an object of this invention to provide a battery cable which is easily attached and detached from a battery terminal without need of tools.

It is another object of this invention to provide a battery cable having attachment means at one end thereof for attachment to a battery terminal comprising on separate ends of a split cable mated and threaded fittings for electrical contact with the battery terminal and a threaded ring encompassing said cable and mated to said threaded fitting for fixedly attaching said cable to the battery terminal.

It is another object of this invention to provide a battery cable having attachment means at one end thereof for attachment to a battery terminal which is easily cleaned.

It is another object of this invention to provide a battery cable having electrical attachment means at one end thereof for attachment to a battery terminal constructed and arranged to permit convenient and easy emergency clamping of so-called jumper cables to the attachment means without damage thereto.

It is another object of this invention to provide a battery cable which, because of its greater simplicity, is practical and inexpensive to manufacture.

These and other objects of the invention will be more fully apparent from the following detailed description with particular emphasis being placed upon the drawing.

The above objects are accomplished in accordance with the present invention through the construction of a battery cable having one free end having means for attachment to a battery terminal comprising a split cable and fitted to each separate end thereof, mated and threaded fittings for electrical contact with the battery terminal and a threaded ring encompassing said cable with the threads mated to the threads of said fittings for fixedly attaching the cable to the battery terminal. Preferably, the ring, although it can be metal, is a large plastic ring containing finger grips to permit sufficient force to be applied in order that the cable can be tightened down and loosened without means of tools. Additionally, the fitting on the separate split cable ends will preferably have mated keys and slots to ensure alignment of the threads on the separate fittings.

The presently described battery cable requires no supporting members for the segments or fittings for contact with the battery terminal and, accordingly, the two segments or fittings can break fully apart for easy removal from the terminal. Moreover, upon removal from the battery terminal, each segment can be held in the hand separately for easy cleaning. Additionally, as noted above, no tools are required for connecting or removal of the battery cable to the terminal. Since the ring encompasses the battery cable, it cannot be lost or misplaced. Moreover, because of the enlarged nature of the ring and the finger indentations, it can be quickly and forceably tightened down without need of tools and, conversely, can be quickly and conveniently loosened without need of tools. Since the electrical contact means for contacting the battery terminal are positioned above the tightening or securing ring, convenient means are provided for emergency clamping of socalled jumper cables without damage to the thread of the clamping segment. Finally, because of the greater simplicity, the connector is practical and inexpensive to manufacture.

THE DRAWINGS AND DETAILED DESCRIPTION OF THE INVENTION

Figure 2:
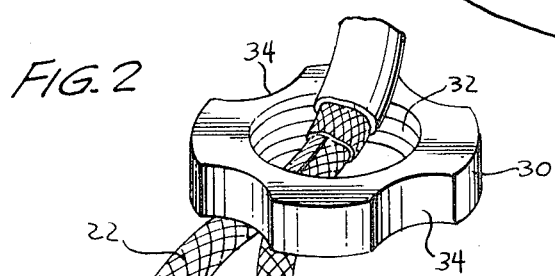
Figure 3:
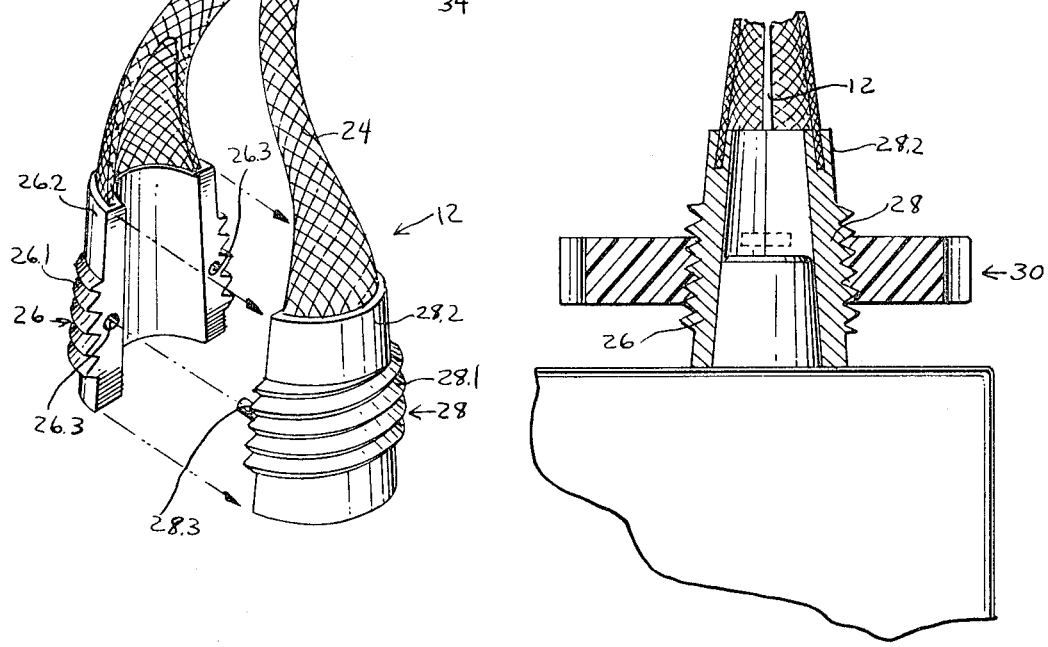

The actual construction of the battery cable of the present invention will be more readily apparent from the accompanying drawings wherein like numerals are employed to designate like parts and wherein FIG. 1 is a perspective view of a battery top having cables made in accordance with the present invention attached to the terminals thereof;

FIG. 2 is an enlarged view of the battery cable end having the improved attachment means; and FIG. 3 is an enlarged cross-sectional view illustrating the attachment means of FIG. 2 tightened down and in contact with the terminals of a battery.

More specifically, the battery cable 10 comprises one end 11 for attachment to a car motor or the like and an end 20 having attachment means for attachment to a battery terminal. The attachment means comprise a split cable end providing strand 22 and 24. Split and mated fittings 26 and 28 are attached to separate ends 22 and 24 of the split cable. Each of the ends has matched threading 26.1 and 28.1. As seen from the drawing, the split segments or fittings have crowns 26.2 and 28.2 extending above the threading which permits clamping of emergency jumper cables or the like to the terminal. Additionally, segment 26 has holes or slots 26.3 to be mated with keys or pins 28.3. These holes and pegs or keys and slots assure proper alignment of the matched threading on segments 26 and 28.

Encompassing said cable is ring 30. This ring has internal threadings 32 which are pitched to mate with threadings 26.1 and 28.1 on the terminal segments. The outer circumference of the ring has finger indentations 34 to permit gripping of the ring permitting rapid removal and replacement of the cable onto the battery terminal. As apparent, since the ring encompasses the battery cable, it cannot be lost or misplaced when loosened from the threaded segments on the cable ends. Additionally, since the fittings or segments of the cable are on separate ends of the split cable end, upon removal from the battery terminal each segment can be easily cleaned with a wire brush, rag, or the like. Furthermore, as most clearly apparent from FIGS. 1 and 3, in the event the battery terminal is corroded or the like the separate segments can be easily broken apart with a coin or other suitable instrument by inserting into slot 12 and prying the segments apart.

As will be apparent to one skilled in the art, the battery cables made in accordance with the present invention can have various modifications without departing from the inventive concept herein disclosed. Thus, the cable can be of any suitable electrically conductive wire and can be coated or uncoated with an insulating covering. The split segments fitted to the separate cable ends can be of any suitable electrically conductive material. The ring 30 can be plastic since it does not form the primary electrical contact between the cable and battery terminal, but as will be apparent can be made of a suitable metal or other material. The aforesaid and other modifications being apparent to one skilled in the art fall within the scope of the present invention.

It is claimed:

1. A terminal connector for a battery comprising an electrically conductive cable having one end thereof split to provide two separate strands, a first and second conductive segment, one on each of the ends of said two separate strands, said conductive segments having threads on the outer surface thereof and constructed and arranged to mate with each other when positioned in electrical contact with a terminal post of a battery and a ring encompassing said cable and having a threaded internal surface, said threading being mated with the threading on said conductive segments to permit securing of said cable to a battery terminal post.

2. The connector of claim 1 wherein the first of said conductive segments contains a slot and the second of said conductive segments contains a mated key for said slot, said segments being constructed and arranged in order that said threads are in alignment when said key is positioned in said slot.

3. The connector of claim 1 wherein each of said segments has a crown which extends above said threads.

4. The terminal connector of claim 1 comprising a slot between said two separate strands when said first and second segments are positioned in electrical contact with the terminal post of a battery, said slot being sufficiently large to permit the insertion of a prying element such as a screwdriver or coin.

5. The connector of claim 1 wherein said ring has an outer circumference substantially greater than the circumference of said mated first and second segments.

6. The terminal connector of claim 5 wherein said ring has finger indentations for gripping said ring.

7. The terminal connector of claim 6 wherein said ring is plastic.

8. The terminal connector of claim 6 wherein said ring is metal.

* * * * *